Figure 3:
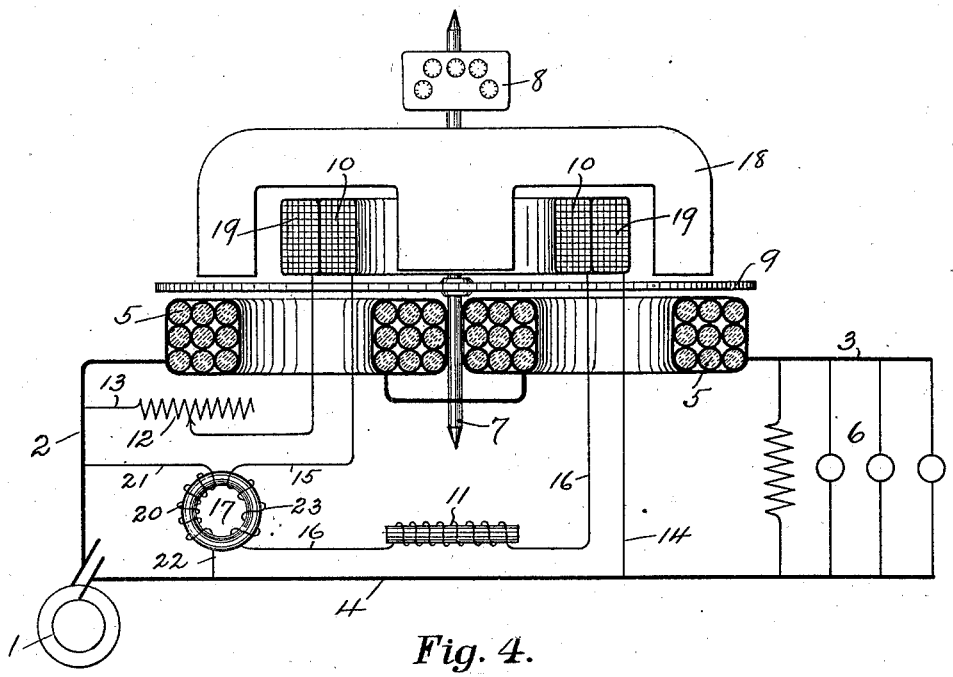

No. 698,646. Patented Apr. 29, 1902.
T. DUNCAN.
ELECTRIC METER.
(Application filed Feb. 23, 1899.)
(No Model.) 3 Sheets—Sheet 1.
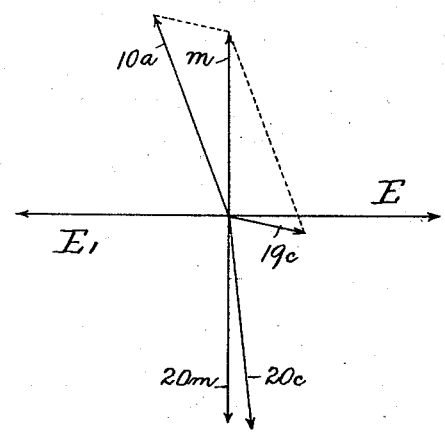
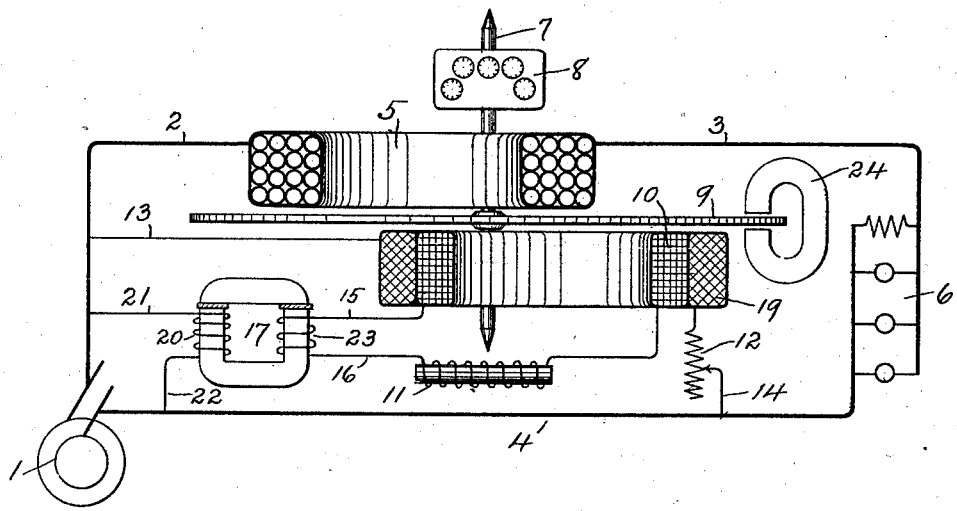
Witnesses
Samuel R. Bachtel
Adelaide Kearns.
Thomas Duncan Inventor
By his Attorneys Chapin & Denny No. 698,646. Patented Apr. 29, 1902.
T. DUNCAN.
ELECTRIC METER.
(Application filed Feb. 23, 1899.)

(No Model.) 3 Sheets—Sheet 2.

Witnesses
Samuel R. Bachtel
Adelaide Kearns

Thomas Duncan Inventor
By his Attorneys Chapin & Denny

No. 698,646. Patented Apr. 29, 1902.
T. DUNCAN.
ELECTRIC METER.
(Application filed Feb. 23, 1899.)

(No Model.) 3 Sheets—Sheet 3.

Witnesses
Samuel R. Bachtel
Adelaide Kearns.

Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,646, dated April 29, 1902.

Application filed February 23, 1899. Serial No. 706,454. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in alternating-current motor-meters of the inductive type for measuring both inductive and non-inductive loads, and more particularly to the class in which two magnetic fields are resolved into a common resultant, which is displaced ninety degrees or a quarter-period from the impressed electromotive force which it represents.

The object of the present invention is to provide an improved means for obtaining the desired phase relation between the fields of the meter. In the preferred embodiment of the invention a magnetic field is produced that will lag behind the impressed electromotive force by approximately two hundred and seventy degrees, or the equivalent of an advance or lead of ninety degrees or a quarter-period ahead of the impressed electromotive force. In meters of this class and type it is customary to lag the magnetic field which represents the pressure to ninety degrees behind said pressure, and in which case the current or ampere field-magnetism approaches closer to the pressure or volt field-magnetism on an inductive load, and if the series current was by some means caused to lag ninety degrees, then the magnetism of the series and shunt field-coils would be in phase and both a quarter-period behind the line-pressure.

In the present invention the magnetism which represents the electromotive force of the system is the equivalent of having a ninety-degree advance of the pressure, and when a lagging current traverses the series or ampere field-coil the angular displacement between the magnetism of the series field-coil and the magnetism which represents the pressure increases until they are a one-half period or one hundred and eighty degrees apart, when the series coil-magnetism lags to ninety degrees behind its pressure. In the first case, where the phases of the series and shunt magnetism are in step, and in the second case, where they are one hundred and eighty degrees apart, and in which it is assumed that the series current lags ninety degrees behind the pressure, in both cases the torque exerted upon the armature will be zero, since the torque at any instance will be proportional to the sine of the angle between the magnetism of the series and shunt coils, and since the sine of both zero and one hundred and eighty degrees is zero there can be no rotation of the armature, the load being a wattless one. Obviously when the load is a non-inductive one in both cases or in which the current traversing the series field-coil is approximately in step with the impressed electromotive force the magnetism of the pressure or shunt field-coil in the first case will be ninety degrees ahead of the line-pressure, and in the second case it will be lagging behind said pressure by the same amount.

Figure 4:
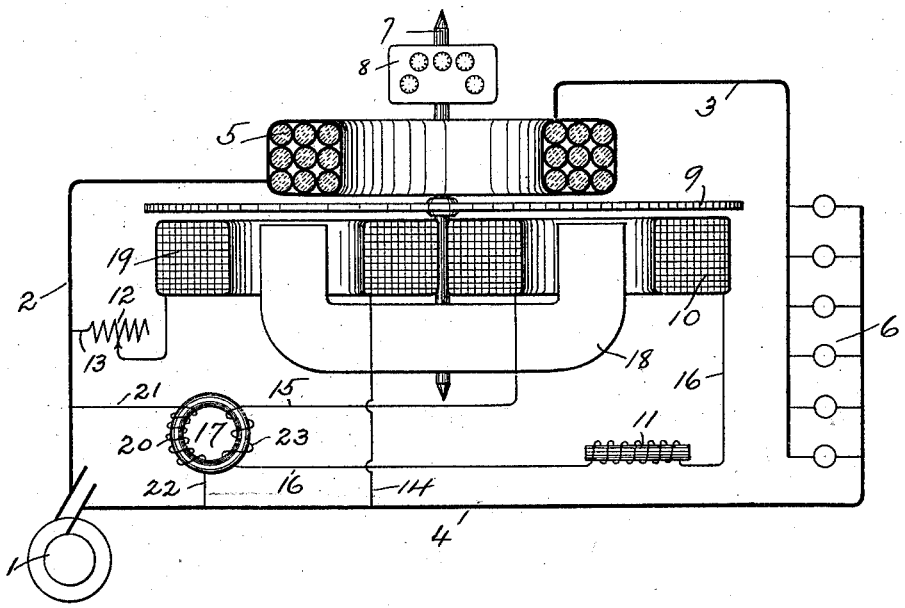
Figure 5:
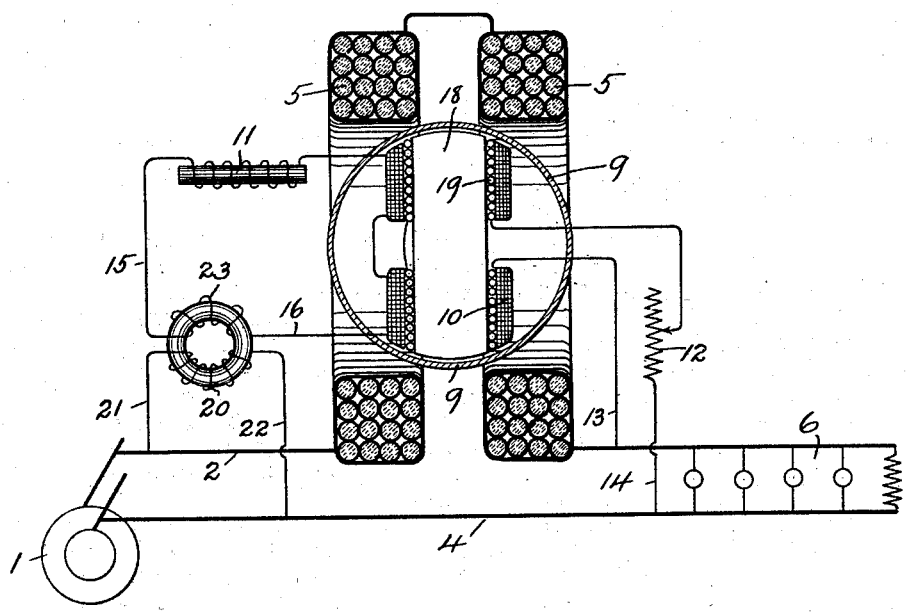
Figure 6:
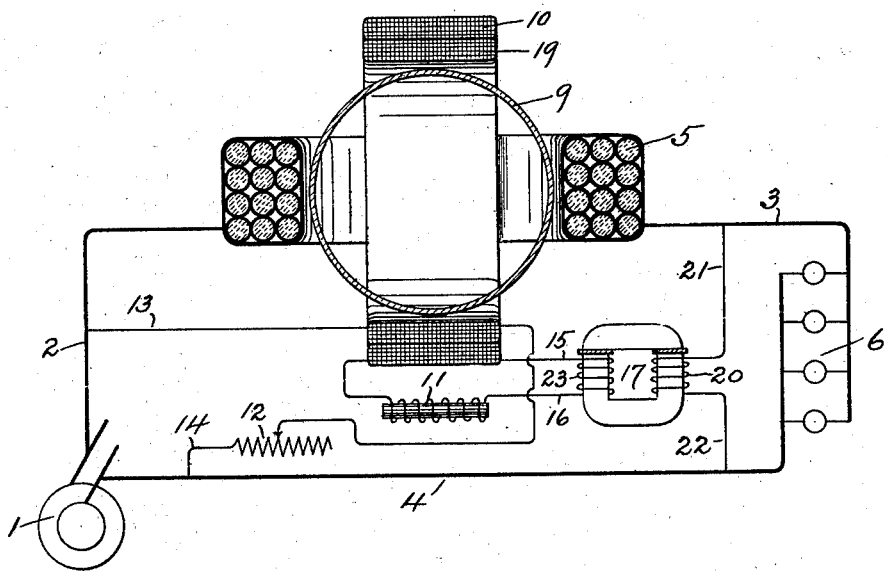

In the accompanying drawings, which form part of this specification, and in which the reference characters indicate like parts, Figure 1 is a vector diagram showing the relative angles and magnitude of the various electromotive forces, currents, and magnetism identified in the invention. Figs. 2, 3, and 4 are front elevation views showing the series and shunt field-coils in section and in use with a disk type of armature; and Figs. 5 and 6 are sectional plan views of the invention as applied to a cylindrical type of armature, all of which are hereinafter more fully described.

In describing the invention with reference to Fig. 2 the series field-coil 5 is traversed by the current which is supplied to the translating devices 6 by the leads 2, 3, and 4 from the generator 1 and sets up a magnetic field in the coil 5 that is proportional to and varies with said current. Adjacent to the lower face of the coil 5 is an aluminium armature 9, mounted upon a suitable spindle 7, which is connected in any well-known manner to the registering device 8 for indicating the revolutions of said spindle. Upon the lower side or face of the armature 9 are two shunt field-coils 10 and 19, each of which is traversed by a current that is proportional to and varies with the pressure in volts between the leads 2 and 4. To produce a rotation of the armature, there must be a difference in phase between the combined magnetism of these two coils 10 and 19 and the magnetism of the series coil 5, and, further, this difference in phase must be exactly ninety degrees to enable the meter to measure inductive loads. By this is meant that when the current through the series field-coil is non-inductive and its magnetism is in phase or step with the impressed electromotive force the magnetism of the coils 10 and 19 must be in quadrature therewith, or ninety degrees from said series field-magnetism and said impressed electromotive force. The manner in which this is accomplished in the present invention is shown in Fig. 1, and in which the line E represents the impressed electromotive force between the leads 2 and 4 of the system. The line $19^c$ represents the angle and magnitude of the current through the shunt field-coil 19. The line $20^c$ represents the current through the primary 20 and its magnetism by the line $20^m$, which is approximately at right angles to the impressed electromotive force E. The line E' represents the secondary electromotive force generated in the transformer secondary 23. The line $10^a$ represents the current flowing through the shunt field-coil 10, which is lagged behind the line E' by the impedance-coil 11, and by combining the lines $10^c$ and $19^c$ into the resultant line $m$, which represents the effective or resultant magnetism of the coils 10 and 19, a ninety-degree displacement from the impressed electromotive force E is obtained.

In adjusting the phase of the pressure-magnetism to exact quadrature the resistance 12 is employed in the usual manner.

The impedance-coil 11 is herein shown as assuming the form of a straight bar; but other and better forms may be used and such as will tend to give the greatest self-induction.

The magnetism of the series coil 5 will change its phase relation to the pressure, depending upon the self-induction of the translating devices, besides changing its strength with the flow of current, and since the magnetic field of the shunt-coils 10 and 19 varies with the electromotive force in strength, but maintains a constant phase angle with the said electromotive force, it necessarily follows that the torque produced by these two magnetic fields upon the armature is proportional to the real or true watts.

To make the speed of the armature proportional to the torque exerted, a proper load or drag must be applied to the armature—such, for example, as a permanent magnet 24, which embraces a portion of the disk armature 9 between its poles in a well-understood manner.

Fig. 3 shows an arrangement of the shunt-coils 10 and 19, having an iron core 18, forming the greater portion of this magnetic circuit, and the use of two series coils connected in series with each other. These series or ampere coils may be connected in parallel, if necessary.

Fig. 4 shows one series coil employed with the two shunt field-coils, the latter of which are not wound with their axes concentric, but occupy positions upon the respective poles of the iron core 18. The coil 10 is supplied by the current which lags somewhat less than two hundred and seventy degrees, and the coil 19 is supplied by the current $19^c$, Fig. 1, setting up thereby a resultant magnetism $m$ through the said core 18, which is a quarter-period ahead of the impressed electromotive force.

Fig. 5 comprises two series field-coils 5 and a cylindrical armature 9, within which are suitably mounted the pressure or shunt coils 10 and 19 and the iron core 18. Fig. 6 also shows a cylindrical type of armature, but an arrangement of the energizing-coils in which the shunt-coils are exterior to the armature.

An indefinite variety of forms and modifications in the arrangement of the energizing-coils and armature may be employed as may be best adapted to the character of the work and size of the meter.

In the several figures of the drawings the wires 13 and 14 are shown as connecting the shunt-coils 19 with the supply-mains 2 and 4, the wires 15 and 16 as connecting the shunt-coil 10 with the secondary circuit 23 and the impedance-coil 11, and the wires 21 and 22 as connecting the transformer primary 20 with the supply-mains 2 and 4.

Having thus described my invention, what I desire to secure by Letters Patent is—

1. In a system of distribution, the combination with an alternating-current generator, of a meter comprising a revoluble armature, a series field-coil in inductive relation with said armature, and a pressure field-coil for producing a field displaced two hundred and seventy degrees from the pressure, divided into two coils, one of said coils receiving its current from the secondary of a transformer, substantially as described.

2. In an induction-meter, the combination of a current-coil, an armature in inductive relation to said current-coil, and a pressure-winding comprising two coils, one of said coils receiving its current from the secondary of a transformer coupled across the circuit-mains thereby to produce a phase difference of two hundred and seventy degrees between the field of said pressure-winding and the pressure, substantially as described.

3. In a system of distribution, comprising transmission-mains and a generator, of a meter adapted for association with said mains, comprising a revolubly-mounted armature, a series field-coil in inductive relation therewith, a shunt-winding also in inductive relation to said armature, said shunt-winding being divided into two coils, one of said coils receiving its current directly from the transmission-mains, the second coil receiving its current from the secondary of the transformer included with the transmission-mains and being adapted to produce a stronger field than the first aforesaid coil thereby to secure a phase displacement of two hundred and seventy degrees between the field of said pressure-winding and the impressed pressure, substantially as described.

4. In a meter, the combination with current and pressure windings for producing magnetic fields differing in phase, said pressure-winding being divided into two coils, one of said coils receiving its current from the source of supply, of a transformer receiving its current also from said source, the other pressure-coil being included in the secondary circuit of said transformer and being adapted to create a stronger magnetism than the first aforesaid pressure-coil, substantially as described.

5. In a system of distribution, the combination with an alternating-current generator, of a meter having current and pressure windings for producing magnetic fields differing in phase, the pressure-winding being divided into two coils, one of said coils being metallically connected with the source of current, of a transformer having its primary metallically connected with the same source of current and its secondary included in circuit with the other of said coils, said coils being in inductive relation with each other, the last aforesaid coil being adapted to create a stronger magnetic field than the first aforesaid pressure-coil, thereby to secure a phase displacement of two hundred and seventy degrees between the magnetic field due to such pressure-winding and the impressed pressure, and an armature for said meter in inductive relation with the meter-windings, substantially as described.

6. In a meter, the combination with a revoluble armature, of a series coil in inductive relation therewith, a shunt-winding also in inductive relation with said armature divided into two coils, one of said coils receiving its current from the secondary of a transformer, said coil being adapted to create a stronger magnetic field than the first aforesaid pressure-coil, substantially as described.

7. In a meter, the combination with a revoluble armature, of a series coil in inductive relation therewith, a pressure-winding also in inductive relation with said armature, said pressure-winding comprising two coils, one of said coils being adapted for metallic inclusion with the source of supply, the second pressure-coil being adapted for inclusion with the secondary of a transformer included with the source of supply, the last aforesaid coil being adapted to create a stronger magnetic field than the first aforesaid coil, thereby to secure a phase displacement of two hundred and seventy degrees between the field due to the pressure-winding and the impressed pressure, substantially as described.

Signed by me at Fort Wayne, Allen county, State of Indiana, this 20th day of February, A. D. 1899.

THOMAS DUNCAN.

Witnesses:
ADELAIDE KEARNS,
AUGUSTA VIBERG.